Jan. 18, 1955 G. H. SMITH 2,699,876
SHOVEL AND BOOM MECHANISM FOR SELF-LOADING VEHICLES
Filed Aug. 11, 1953 3 Sheets-Sheet 1

INVENTOR.
Guillermo Hay Smith,
BY Ivan P. Tschoff,
Attorney

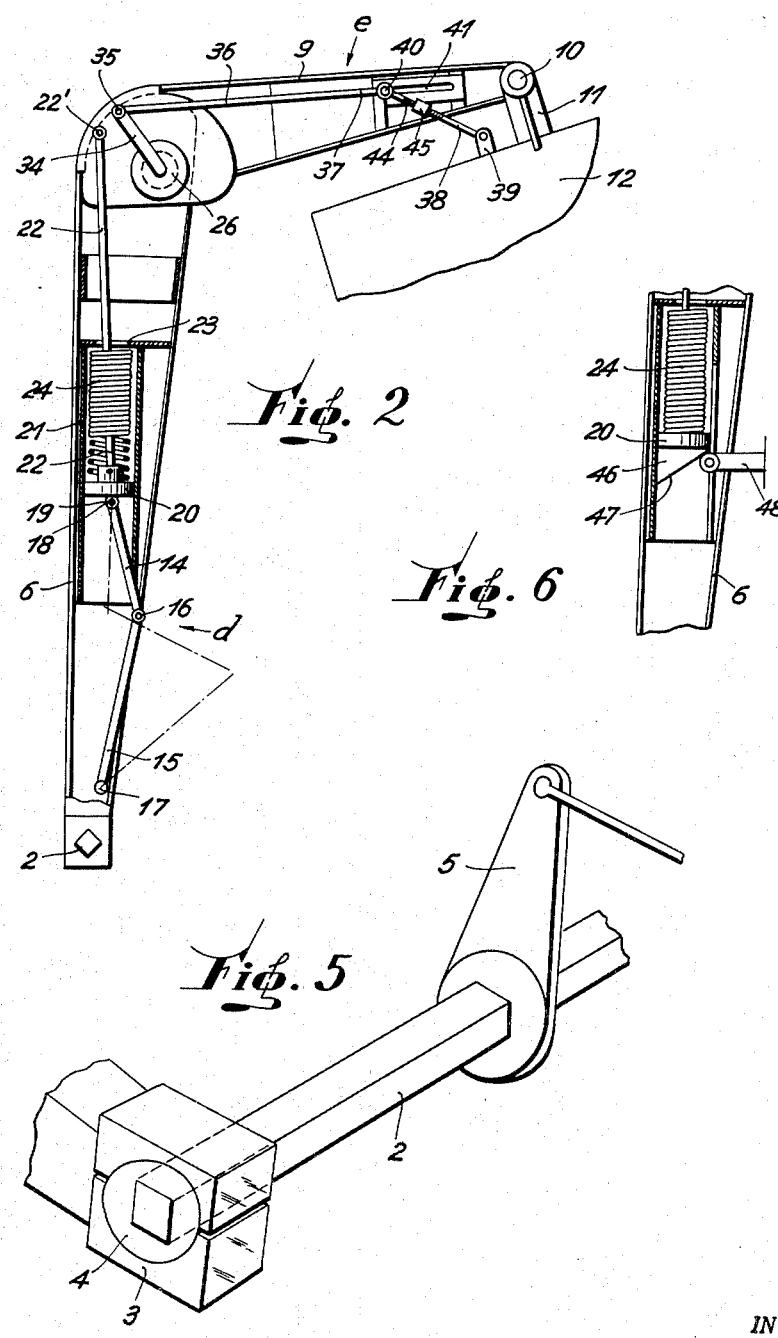

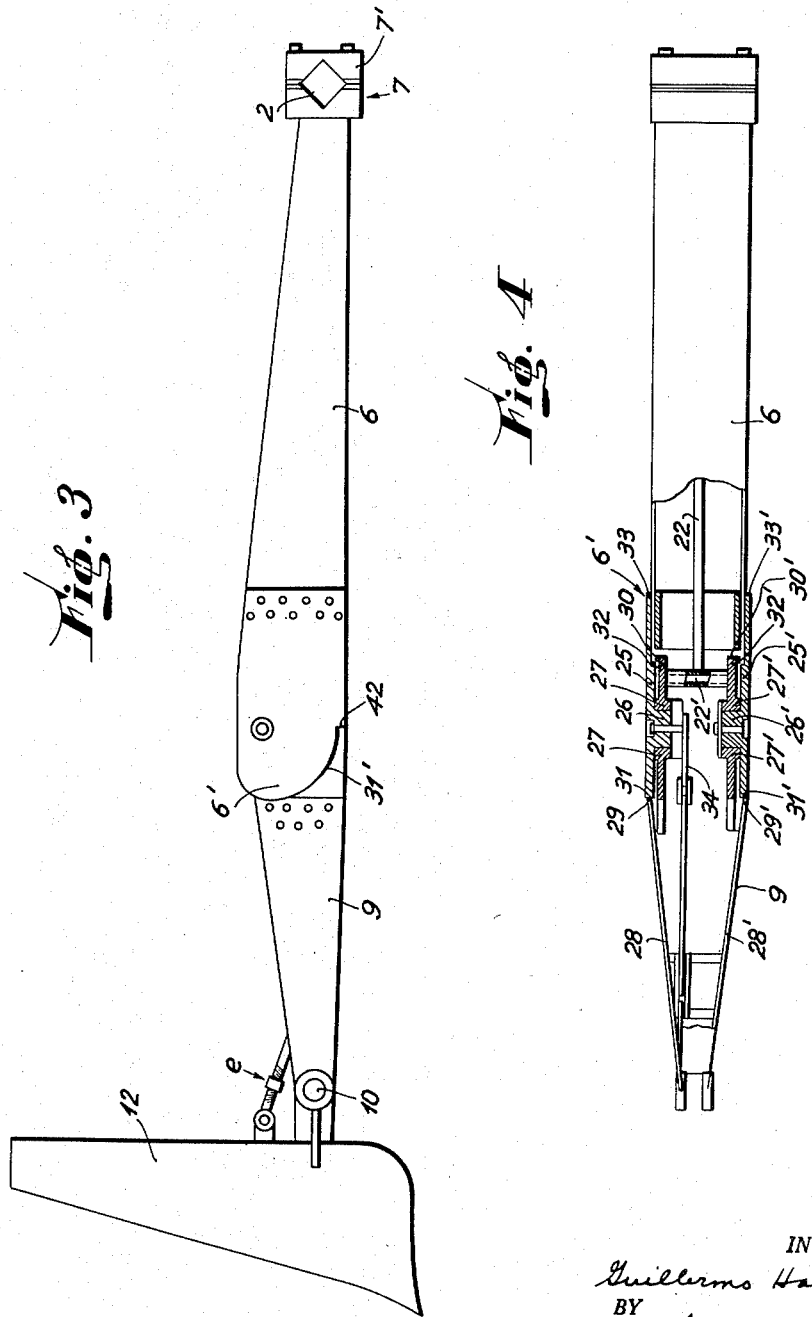

United States Patent Office 2,699,876
Patented Jan. 18, 1955

2,699,876

SHOVEL AND BOOM MECHANISM FOR SELF-LOADING VEHICLES

Guillermo Hay Smith, Buenos Aires, Argentina

Application August 11, 1953, Serial No. 373,631

6 Claims. (Cl. 214—78)

This invention relates to a mechanism applicable to automotive vehicles for loading materials on said vehicles or on units hauled thereby.

The main feature of the loading mechanism of this invention resides in the readiness with which it can be coupled to a truck of the type provided with a box preferably tiltable, or to a tractor suitable for hauling a load-receiving vehicle.

The mechanism in question is connected to a control shaft mounted transversely on the truck or tractor chassis and is connected for its actuation with transmission elements governed by the vehicle motor.

Broadly, the loading mechanism of this invention comprises two pairs of arms pivoted to each other, located respectively at either side of the vehicle and connected on one hand to the above-mentioned control shaft and associated on the other to a loading shovel.

The control shaft as well as said arms, are so arranged that the shovel is located against the ground surface opposite the vehicle control cabin. In this position, the arms are substantially aligned and the shovel will be ready for receiving the materials to be loaded. When said materials are constituted by granular material such as ground stone, gravel, sand or earth, it will be sufficient to advance the vehicle against the pile of said material so that the shovel, upon being digged therein, will load by itself. Once the shovel has been loaded, the control shaft is rotated, thereby raising the first pair of arms which in their motion will carry the second pair of arms. In turn, the latter will cause the lifting of the loaded shovel over the vehicle cabin.

Shortly before the first pair of arms have completed their movement through about 90°, automatic control means are operated which will cause the turning of the second pair of arms towards the vehicle box.

Simultaneously with the movement of the second pair of arms, other automatic control means are actuated so as to cause the tilting of the shovel and therefore the discharge of the material into the vehicle box.

When the loading mechanism is in discharging position, the control shaft is actuated further until none of members thereof will extend substantially beyond the vehicle structure, whereupon locking the assembly and the vehicle will be thus ready for transporting the load.

In order to return the loading device to the operative position and hold the second pair of arms while unloading, a heavy spring is provided which is compressed by the means actuating the second pair of arms.

The unlocking of the control shaft will release said spring which on expanding will bring the arms of the second pair in line with those of the first pair. With the assembly thus arranged it will assume the loading position by simple gravity.

The lowering of the loading mechanism is controlled by means of the control shaft.

This invention also contemplates other objects which will become apparent in the course of the following description.

In order that the invention may be more clearly understood and readily carried out, a preferred embodiment thereof has been illustrated by way of example in the accompanying drawings, in which:

Fig. 2 is a longtudinal sectional view of the loading mechanism when in unloading position.

Fig. 3 is a side view of the mechanism in loading position.

Fig. 4 is a plan view of the mechanism in loading position, partly in section along the line A—A in Fig. 3.

Fig. 5 is a schematic perspective view showing the manner in which the loading mechanism is mounted on a control shaft.

Fig. 6 is a view showing a modified embodiment of the means for actuating some of the members of the loading mechanism.

The same reference characters are used in indicate like or corresponding parts or elements throughout the drawings.

Figure 1:
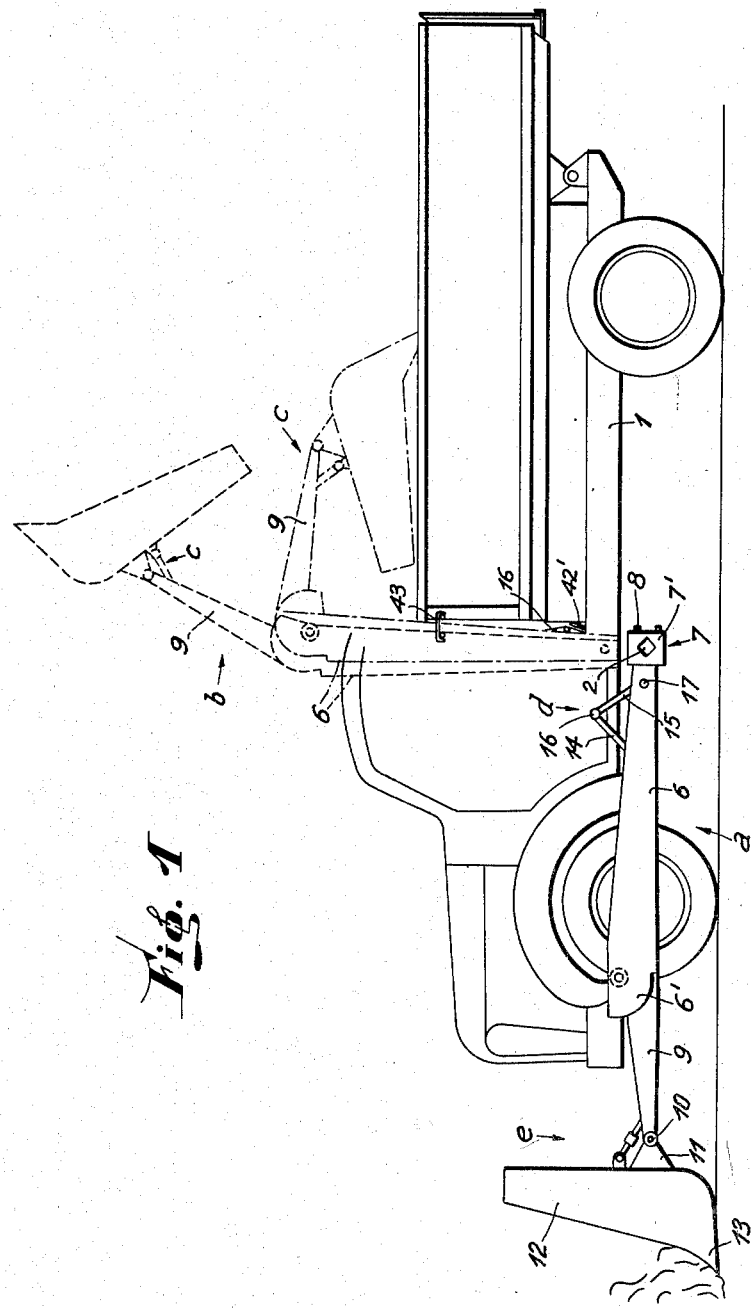
Fig. 1 is a general view of a truck incorporating the loading mechanism of this invention, showing in full lines the loading position, in dash lines the unloading position, and in dot-dash lines the transporting position of said mechanism.

As may be seen from the drawings, the mechanism of this invention is applicable to vehicles such as the truck shown in Fig. 1.

On the lower part of the chassis 1, said truck carries a cross-shaft 2, preferably square in cross-section and provided with means for connecting same to the chassis 1, said means comprising detachable bushings 3 each housing therein a cylindrical portion 4 provided at each end of said shaft 2.

Said shaft 2 has fixed thereto a lever 5 controlled by members indirectly actuated by the vehicle engine. This is clearly shown in Figs. 1 and 5, excepting the lever 5 control means which are not shown.

The loading mechanism as shown in Figs. 1 to 4 comprises a first pair of arms 6 located one at each side of the vehicle and provided at one of their respective ends with detachable clamping members 7 clamping the ends of the quadrangular shaft 2.

In this manner, the arms 6 will remain rigidly connected to the control shaft 2 and in condition to be readily removed therefrom by simply unscrewing the nuts 8 locking the movable portion 7' of clamp 7.

It will be understood from the above that the loading mechanism can be rapidly detached from the truck or tractor to which it is applied when the use given thereto does not require the loading equipment. This is one of the main features of the mechanism of this invention.

The ends 6' of arms 6 are rotatively connected to a second pair of arms 9 the free ends of which are provided with shafts 10 having rotatively associated therewith respective reinforced ears 11 fixed to the body of a loading shovel or bucket 12.

In Fig. 1, the loading mechanism is shown in full lines in the loading position, resulting when the arms 6 and 9 are aligned and the shovel 12 is resting on the ground or on the materials to be loaded.

The shovel 12 is formed with a sharp edge 13 arranged that when the vehicle is driven forward, it will dig into the material to be loaded, thereby filling same with the material.

The raising of the shovel 12 from the "loading position" *a* shown in full lines in Fig. 1, to the unloading position *b* shown in dash lines in the same Fig. 1, is obtained first by means of the control shaft 2 which will raise the first pair of arms 6 and the latter in turn will raise the arms 9 and shovel 12. Secondly, there are provided automatic control means *d* which will cause the tilting of the arms 9 in the manner shown in the "unloading position" *b*, and means *e* causing the shovel 12 to turn about the shaft 10 and acting simultaneously with the means *d* and capable of causing said shovel to assume the "transporting position" *c* shown in Fig. 1.

The automatic control means *d* and *e* which are only shown in part in Fig. 1, are clearly illustrated in the sectional view of Fig. 2 and the plan view of Fig. 4.

The arms 6 are hollow and open in part at one of the sides thereof. In practice, they may be made of relatively heavy sheet metal so as to constitute a standard U section.

Said means *d* automatically causing the operation of the arms 9 are housed within said hollow arms 6.

The means *d* (Fig. 2) in each of the arms 6 are formed by pairs of bars 14 and 15 pivoted to each other by means of a pivot pin 16 and rotatively connected to a shaft 17 mounted on arm 6 and associated with a small shaft 18 mounted on a finger 19 integral with a piston 20 housed in a guiding tube 21 fixed to the walls of said arm 6.

The piston 20 has rotatively secured thereto a bar 22 the opposite end of which is rotatively connected to the arm 9 by means of a shaft 22'.

A heavy spring 24 is inserted between the piston 20 and the bottom 23 of guide tube 21.

As clearly shown in Fig. 4, the inner faces of the side walls 25 and 25' at the end 6' of arm 8 are formed with cylindrical projections 26 and 26' constituting the studs on which are mounted the bushings 27 and 27' provided by the side walls 28 and 28' of arm 9.

Also, said side walls 28 and 28' are provided with curved shoulders 29 and 29', 30 and 30' slidably seated on cooperating curved bearing surfaces 31—31' and 32—32' provided by the side walls 33 and 33' of the arm 6.

The means e for actuating mechanically the shovel 12 comprise, in each of the arms 9, a lever 34 (Figs. 2 and 4) fixed to the cylindrical projection 26 on arm 6 and rotatively connected at the end 35 thereof to a bar 36 the end 37 of which is connected to a further small bar 38 which is in turn rotatively associated with an ear 39 fixed to the body of shovel 12 and located at a certain distance from the main ears 11.

Also, the pivot pin for bars 36 and 38, indicated at 40, is slidably mounted in a guideway 41 mounted within the arm 9.

The operation of the loading device as regards the elements indicated by the reference characters d and e is obtained with the aid of the force exerted by the control shaft 2.

In accordance with the above and assuming the mechanism of this invention is in the "loading position" a, Fig. 1, the rotation of the control shaft 2 will gradually raise the assembly which will retain its straight position by virtue of the arms 6 and 9 abutting against the points 42 (Fig. 3).

Always in accordance with Fig. 1, in the position a the bars 14 and 15 will be partly collapsed, forming an angle the apex of which is at the pivotal connection 16.

As the shaft 2 rotates, the mechanism will be raised, tending to reach the "unloading position" b. Before this occurs, the pivot pins 16 of bars 14 and 15 corresponding to the arms 6 at either side of the vehicle will engage stops 42' (Fig. 1) fixed to the vehicle structure.

From the time of said engagement, the movement of shaft 2 and of the arms 6 will cause the extension of bars 14 and 15, as clearly shown in Fig. 2. The extension of bars 14 and 15 will in turn cause the movement of pistons 20, the compression of the springs 24 and the raising of the bars 22.

In turn, the raising of the bars 22 will cause the rotation of the arms 9 and the tilting thereof towards the vehicle loading box.

The movement of the arms 9 will shift the pivot 40 in the guideway 41, thereby pulling the small bar 38 which will cause the rotation of the shovel 12 about the shaft 10. The mechanism will thus be arranged in the "unloading position" b shown in Fig. 1.

In order to shift the mechanism to the "transporting position" c it will be necessary to further rotate the shaft 2 slightly, thus increasing the extension of bars 14 and 15 with a resulting effect on the means d and e which will increase the tilting of the arms 9 and the rotation of the shovel 12.

Once the loading mechanism members have reached the position c, the shaft 2 is locked and the arms 6 are secured by means of safety hooks 43 fixed to the truck loading box and shown in Fig. 1.

When it is desired to again use the loading mechanism, the hooks 43 are removed and the control shaft 2 is released.

The force accumulated in the spring 24, Fig. 2, will cause the lowering of the piston 20, thereby pulling the bar 22 which will cause the arms 9 and shovel 12 to return to their initial position. Also, the collapsing of the bars 14 and 15 will simultaneously cause the movement of the arms 6 away from the stops 42'. The force of gravity will complete the return of the assembly to the position a.

The mechanism of this invention also includes means capable of allowing the graduating and tilting of the shovel in the loading position thereof. Said means comprise a bar 38 divided in two independent portions, having screw-threads at their adjacent ends and connected by means of a threaded sleeve 45 the rotation of which in one direction will cause the movement of the bar portions towards each other, while the rotation in the opposite direction will move said bar portions away from each other.

It will be understood that an increase in the length of the lever 38 will cause an increased tilting towards the ground of the shovel sharp edge 13 and consequently an increased loading power thereof.

Conversely, if the bar 38 is shortened, the edge 13 will be raised somewhat, sliding on the ground without danger of blocking through partial digging into the ground.

Fig. 6 illustrates a modified embodiment wherein the means d are substituted by others giving substantially equivalent results.

In said modified embodiment, the piston 20 forms part of a wedge 46 the inclined face 47 of which is capable of engaging a projecting stop 48 formed in the vehicle structure.

In accordance with the above, the approach of the arm 6 to the stop 48 will cause the engagement of the face 47 against the latter. Said engagement will commence at the base of the wedge 46 whereby the gradual approach of the arm 6 will cause the raising of the piston 20, with the results already explained in connection with Fig. 2.

As described above, the invention is clear and will require no further explanation to those skilled in the art.

It is evident that in carrying out this invention, many changes and/or modifications will occur to those skilled in the art, without departing from the scope of the invention as clearly set forth in the appended claims.

I claim:

1. A mechanism applicable to automotive vehicles for loading materials thereon which comprises a first pair of arms located respectively on either side of the vehicle, said vehicle including a chassis having a lower and upper part, bearings integral with the lower part of said chassis, a control shaft mounted transversely on said bearings and indirectly operatively associated with the motor of said vehicle, the ends of said control shaft being of a preferably square cross section and are adapted to be readily fixed to dismountable clamps secured to one end of said first pair of arms, a second pair of arms pivoted to the free ends of said first pair of arms, a loading shovel pivotally connected to the free ends of said second pair of arms, said free ends of the first pair of arms being provided with cylindrical projections on which are mounted bushings provided on the second pair of arms, automatic control means comprising a plurality of pivoted and collapsible rods connected to fixed points on said first pair of arms, one of each pair of said pivoted rods being secured at a fixed point on said arms, whilst said other rods are associated with a piston housed in a guiding tube, an expansion spring located in said tube and adapted to be compressed by said piston, a bar secured to said piston at one of its ends, the other end being pivoted to one of said second pair of arms, second automatic control means comprising movable elements associated with said second pair of arms and adapted to cause the displacement thereof, stops fixed to the vehicle adapted to cooperate with said pivoted rods and cause the opening thereof, spring means adapted to be compressed by said movable elements and automatic control means for said loading shovel constituted by a plurality of levers associated with said loading shovel, the first pair of arms and the second pair of arms.

2. A mechanism applicable to automotive vehicles for loading materials thereon which comprises a first pair of arms located respectively on either side of the vehicle, said vehicle including a chassis having a lower and upper part, bearings integral with the lower part of said chassis, a control shaft mounted transversely on said bearings and indirectly operatively associated with the motor of said vehicle, the ends of said control shaft being of preferably square cross section and are adapted to be readily fixed to dismountable clamps secured to one end of said first pair of arms, a second pair of arms pivoted to the free ends of said first pair of arms, a loading shovel pivotally connected to the free ends of said second pair of arms, said free ends of the first pair of arms being stepped and having curved faces constituting guides for cooperating with curved surfaces provided on the second pair of arms, automatic control means comprising a plurality of pivoted and collapsible rods, one of each pair of said pivoted rods being secured at a fixed point on said arms, whilst said other rods are associated with a piston housed in a guiding tube, an expansion spring located in said tube and adapted to be compressed by said piston, a bar secured to said piston at one of its ends, the other end being pivoted to one of said second pair of arms, second automatic control means comprising movable elements associated with said second pair of arms and adapted to cause the displacement thereof, stops fixed to the vehicle adapted to cooperate with said pivoted rods and cause the opening thereof, spring means adapted to be compressed by said movable elements and automatic control means for said loading shovel constituted by a plurality of levers associated with said loading shovel, the first pair of arms and the second pair of arms.

3. A mechanism applicable to automotive vehicles for loading materials thereon which comprises a first pair of arms located respectively on either side of the vehicle, said vehicle including a chassis having a lower and upper part, bearings integral with the lower part of said chassis, a control shaft mounted transversely on said bearings and indirectly operatively associated with the motor of said vehicle, the ends of said control shaft being of preferably square cross section and are adapted to be readily fixed to dismountable clamps secured to one end of said first pair of arms, a shovel pivotally connected to the free ends of said second pair of arms, said free ends of the first pair of arms being stepped and having curved faces constituting guides for cooperating with curved surfaces provided on the second pair of arms, the curved faces of the first and second arms including reciprocal stops adapted to limit the movement of the second pair of arms around the cylindrical projections provided on the first pair of arms, automatic control means comprising a plurality of pivoted and collapsible rods, one of each pair of said pivoted rods being secured at a fixed point on said arms, whilst said other rods are associated with a piston housed in guiding tube, an expansion spring located in said tube and adapted to be compressed by said piston, a bar secured to said piston at one of its ends, the other end being pivoted to one of said second pair of arms, second automatic control means comprising movable elements associated with said second pair of arms and adapted to cause the displacement thereof, stops fixed to the vehicle adapted to cooperate with said pivoted rods and cause the opening thereof, spring means adapted to be compressed by said movable elements and automatic control means for said loading shovel constituted by a plurality of levers associated with said loading shovel, the first pair of arms and the second pair of arms, said automatic control means for said shovel comprising levers pivotally connected to one end to the first pair of arms and located intermediately within a slide provided in the second pair of arms, the other end being pivoted to projections provided on the shovel body.

4. A mechanism applicable to automotive vehicles for loading materials thereon which comprises a first pair of arms located respectively on either side of the vehicle, said vehicle including a chassis having a lower and upper part, bearings integral with the lower part of said chassis, a control shaft mounted transversely in said bearings and indirectly operatively associated with the motor of said vehicle, the ends of said control shaft being of preferably square cross section and are adapted to be readily fixed to dismountable clamps secured to one end of said first pair of arms, a shovel pivotally connected to the free ends of said second pair of arms, said free ends of the first pair of arms being stepped and having curved faces constituting guides for cooperating with curved surfaces provided on the second pair of arms, the curved faces of the first and second arms including reciprocal stops adapted to limit the movement of the second pair of arms around the cylindrical projections provided on the first pair of arms, automatic control means comprising a plurality of pivoted and collapsible rods, one of each pair of said pivoted rods being secured at a fixed point on said arms, whilst said other rods are associated with a piston housed in a guiding tube, an expansion spring located in said tube and adapted to be compressed by said piston, said piston having integral therewith a wedge member, one inclined face of which is adapted to enter into contact with the stops on the vehicle, a bar secured to said piston at one of its ends, the other end being pivoted to one of said second pair of arms, second automatic control means comprising movable elements associated with said second pair of arms and adapted to cause the displacement thereof, stops fixed to the vehicle adapted to operate with said pivoted rods and cause the opening thereof, spring means adapted to be compressed by said movable elements and automatic control means for said loading shovel constituted by a plurality of levers associated with said loading shovel, the first pair of arms and the second pair of arms, said automatic control means for said shovel comprising levers pivotally connected at one end to the first pair of arms and located intermediately within a slide provided in the second pair of arms, the other end being pivoted to projections provided on the shovel body.

5. A mechanism applicable to automotive vehicles for loading materials thereon which comprises a first pair of arms having free ends, said first pair of arms being located respectively on either side of the vehicle, said vehicle including a chassis, bearings integral with said chassis, a control shaft mounted transversely on said bearings and indirectly operatively associated with the motor of said vehicle, said control shaft being connected to said first pair of arms, a second pair of arms having free ends and pivoted to the free ends of said first pair of arms, a loading shovel pivotally connected to the free ends of said second pair of arms, said free ends of the first pair of arms being provided with projections connected to the second pair of arms, automatic control means comprising a plurality of pivoted and collapsible rods connected to fixed points on said first pair of arms, one of each pair of said pivoted rods being secured at a fixed point on said arms, whilst said other rods are associated with a piston housed in a guiding tube, an expansion spring located in said tube and adapted to be compressed by said piston, a bar secured to said piston at one of its ends, the other end being pivoted to one of said second pair of arms, second automatic control means comprising movable elements associated with said second pair of arms and adapted to cause the displacement thereof, stops fixed to the vehicle adapted to cooperate with said pivoted rods and cause the opening thereof.

6. A mechanism applicable to automotive vehicles for loading materials thereon which comprises a first pair of arms having free ends, said first pair of arms being located respectively on either side of the vehicle, said vehicle including a chassis, bearings integral with said chassis, a control shaft mounted transversely on said bearings and indirectly operatively associated with the motor of said vehicle, said control shaft being connected to said first pair of arms, a second pair of arms having free ends and pivoted to the free ends of said first pair of arms, a loading shovel pivotally connected to the free ends of said second pair of arms, said free ends of the first pair of arms being provided with projections connected to the second pair of arms, automatic control means comprising a plurality of pivoted and collapsible rods connected to fixed points on said first pair of arms, one of each pair of said pivoted rods being secured at a fixed point on said arms, whilst said other rods are associated with a piston housed in a guiding tube, an expansion spring located in said tube and adapted to be compressed by said piston, a bar secured to said piston at one of its ends, the other end being pivoted to one of said second pair of arms and second automatic control means for said loading shovel constituted by a plurality of levers associated with said loading shovel, the first pair of arms and the second pair of arms.

References Cited in the file of this patent

UNITED STATES PATENTS

| Number | Name | Date |
|---|---|---|
| 1,458,775 | Nilson | June 12, 1923 |
| 1,565,829 | Thibaudeau | Dec. 15, 1925 |
| 1,892,243 | Lambert | Dec. 27, 1932 |
| 2,109,440 | Villerup | Feb. 22, 1938 |
| 2,441,591 | Owen | May 18, 1948 |
| 2,488,699 | Anthony | Nov. 22, 1949 |
| 2,652,936 | Hensley | Sept. 22, 1953 |